(12) United States Patent
Kumar et al.

(10) Patent No.: US 8,290,139 B2
(45) Date of Patent: Oct. 16, 2012

(54) METHOD AND APPARATUS FOR MAINTAINING DYNAMIC QUEUES IN CALL CENTERS USING SOCIAL NETWORK INFORMATION

(75) Inventors: Sanjeev Kumar, Sunnyvale, CA (US); Mukul Jain, San Jose, CA (US); Laurent Philonenko, Palo Alto, CA (US); Joseph Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1112 days.

(21) Appl. No.: 12/182,743

(22) Filed: Jul. 30, 2008

(65) Prior Publication Data
US 2010/0027778 A1 Feb. 4, 2010

(51) Int. Cl.
*H04M 3/00* (2006.01)

(52) U.S. Cl. .................. 379/265.02; 379/265.12

(58) Field of Classification Search ............. 379/265.02, 379/265.09, 265.12
See application file for complete search history.

(56) References Cited

U.S. PATENT DOCUMENTS

| 7,958,561 B1 * | 6/2011 | Croak et al. ............ 726/27 |
| 2002/0022977 A1 * | 2/2002 | Schiff et al. ............ 705/5 |
| 2003/0169870 A1 * | 9/2003 | Stanford ............ 379/265.12 |
| 2009/0136013 A1 * | 5/2009 | Kuykendall et al. ...... 379/142.17 |
| 2011/0166893 A1 * | 7/2011 | McConnell et al. ............ 705/4 |

* cited by examiner

Primary Examiner — Rasha Al Aubaidi
(74) Attorney, Agent, or Firm — P. Su

(57) ABSTRACT

In one embodiment, a method includes connecting on a call with a caller and determining if social network information associated with the caller is available. If it is determined that social network information associated with the caller is available, the social network information is obtained and utilized to identify at least a first agent suitable for participating on the call with the caller. The first agent is associated with a call center. The method also includes providing the caller with information that identifies the first agent as being suitable for participating on the call with the caller.

27 Claims, 10 Drawing Sheets

METHOD AND APPARATUS FOR MAINTAINING DYNAMIC QUEUES IN CALL CENTERS USING SOCIAL NETWORK INFORMATION

BACKGROUND OF THE INVENTION

The present invention relates generally to communications systems.

A caller to a customer call center often prefers to be served by an agent who has the particular expertise or knowledge that the caller seeks. When the caller is able to be connected on a call with a call center agent who has the expertise needed to solve the caller's problem, the problem may be solved expediently, and the caller's level of satisfaction may be relatively high.

In general, when a caller calls into a call center, the call center may obtain information from the caller which identifies the caller. The call center may also obtain information that enables a set of appropriate agents, e.g., a set of agents with particular expertise that is relevant to the caller, to be identified. Once a set of appropriate agents is identified, the caller may sometimes be allowed select a particular agent to assist him or her. Alternatively, the call center may place the caller in a queue for one of the appropriate agents, or the call center may place the caller in a general queue associated with the overall set of appropriate agents.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

Figure 1:
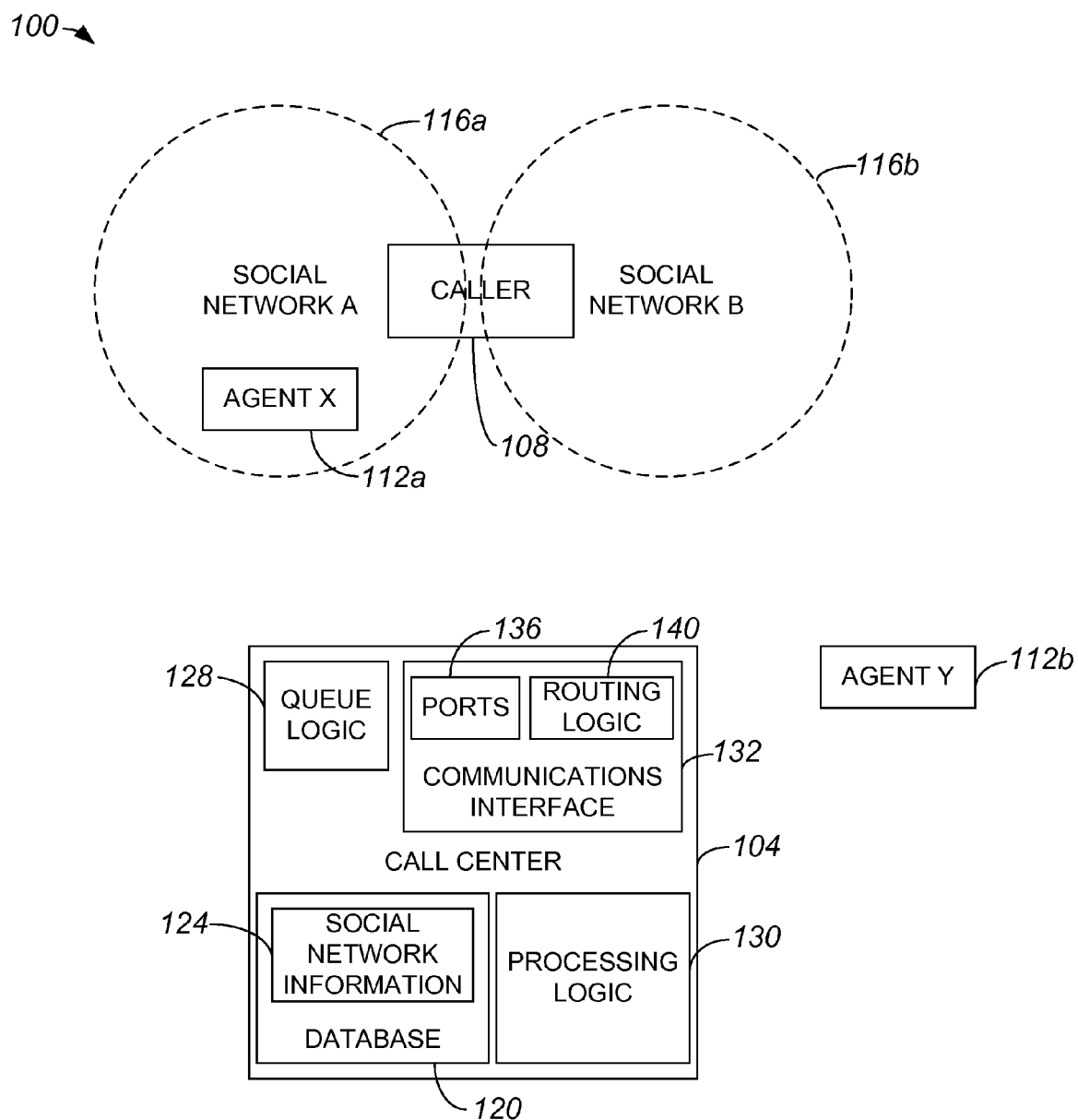
FIG. 1 is a diagrammatic representation of a first overall system which includes a call center that utilizes social network information to identify call center agents who are socially networked to a caller in accordance with an embodiment of the present invention.

According to one aspect of the present invention, a method includes connecting on a call with a caller and determining if social network information associated with the caller is available. If it is determined that social network information associated with the caller is available, the social network information is obtained and utilized to identify at least a first agent suitable for participating on the call with the caller. The first agent is associated with a call center. The method also includes providing the caller with information that identifies the first agent as being suitable for participating on the call with the caller.

Description

When a caller, e.g., a client or a customer, calls into a call center seeking assistance from an agent, the call center generally identifies a set of agents that is particularly suitable for providing the assistance. Typically, the call center will identify a set of agents who have the appropriate expertise to provide assistance to the caller. The caller may provide information that indicates the type of expertise that he or she is seeking.

As the number of agents associated with call centers increase, the likelihood that one or more agents who have the expertise or knowledge desired by a caller is linked or otherwise related to the caller increases. Hence, informing the caller of a link or relationship he has to an agent may cause the caller to elect to communicate with that agent over other agents.

In one embodiment, social network information may be used to identify specific agents who may provide assistance to a caller. That is, social network information may be used by a call center to identify agents with expertise sought by a caller who also have a social relationship to the caller. By way of example, if two agents are suitable for providing assistance to a caller and one of those agents is a member of the caller's extended social network, that agent may be identified to the caller as being in the caller's extended social network. As will be appreciated by those skilled in the art, a caller's extended social network may include individuals who are directly in his or her own social network, as well as individuals who are in social networks of those who are in the caller's own social network. Some callers may prefer to receive assistance from an agent with whom he has either a direct social relationship or an indirect social relationship, e.g., a relationship in which a caller and an agent share a common social connection. For instance, if a caller is provided with information which indicates that a particular agent is a friend of a friend, the caller may prefer to interact with that agent because of the know relationship between the agent and the friend of the caller.

A call center may obtain information regarding the social networks in which a caller participates, i.e., social network details, and then use that information to identify agents who are effectively within at least one of those social networks. Such information may be obtained at substantially any time, as for example at predetermined times or substantially in real-time when a caller calls into a call center. A call center may obtain login information and/or passwords associated with a caller, and then use that information to access social networking applications in order to obtain information which identifies parties who are in the caller's social network or otherwise associated with the caller's social network.

Social network information obtained by the call center may be stored locally with respect to the call center such that the social network information is readily available when needed. Referring initially to FIG. 1, a first overall system which includes a call center that utilizes stored social network information to identify call center agents who are socially networked to a caller will be described in accordance with an embodiment of the present invention. An overall system 100 includes a call center 104 with which agents 112a, 112b are associated. Agents 112a, 112b provide assistance to callers such as caller 108 when the callers contact call center 104.

Call center 104 includes a communications interface 132 which allows agents 112a, 112b to communicate with caller 108. Communications interface 132 includes ports 136 on which a call from caller 108 may be received, as well as routing logic 140 which allows calls from caller 108 to be routed to an appropriate agent 112a, 112b. Routing logic 140 may include hardware and/or software logic embodied in a tangible media that, when executed, is operable to route a call from caller 108.

Generally, communications interface 132 is configured to enable social network information 124 to be obtained regarding social networks 116a, 116b and stored into a database 120. Social network information 124 is typically obtained from social networking websites or applications (not shown) associated with social networks 116a, 116b. In one embodiment, social network information 124 includes social network details such as information pertaining to caller 108 and social networks 116a, 116b of caller 108. Social network details may generally include, but are not limited to including, details of one or more public networking websites of which caller 108 is a member, details regarding any membership of caller 108 in social organizations. Public networking websites may include websites such as Linked-In, Facebook, and/or MySpace. Social organizations may include alumni associations, professional organizations, fraternities, sororities, and/or clubs.

Database 120 may be updated substantially periodically. As such, social network information 124 may be associated with a time lag. That is, when caller 108 calls into call center 104, social network information 124 may not be the most recent information associated with social networks 116a, 116b.

Call center 104 also includes queue logic 128. Like routing logic 140, queue logic 128 may also include hardware and/or software logic. Queue logic 128 is arranged to maintain dynamic queues associated with agents 112a, 112b. Queue logic 128 may place caller 108 into an appropriate queue depending upon which agent 112a, 112b is selected to provide assistance to caller 108.

When caller 108 calls into call center 104, call center 104 may use processing logic 130 to identify an area of expertise that may be useful in providing assistance to caller 108, and to identify agents 112a, 112b as having that area of expertise. Processing logic 130 may also use social network information 124 to identify agent 'X' 112a as being a member of social network 'A' 116a associated with caller 108 and, further, to identify agent 'Y' 112b as not being a member of either social network 116a, 116b. Processing logic 130, which may also be implemented as hardware and/or software logic, cooperates with queue logic 128 to allow caller 108 to elect to receive assistance from agent 'X' 112a, and to add caller 108 to a dynamic queue (not shown) of callers who are awaiting assistance from agent 'X' 112a. In one embodiment, queue logic 128 may add caller 108 to a dynamic queue (not shown) that is associated with substantially all agents who have the expertise desired by caller 108 and are socially networked to caller 108.

Figure 2:
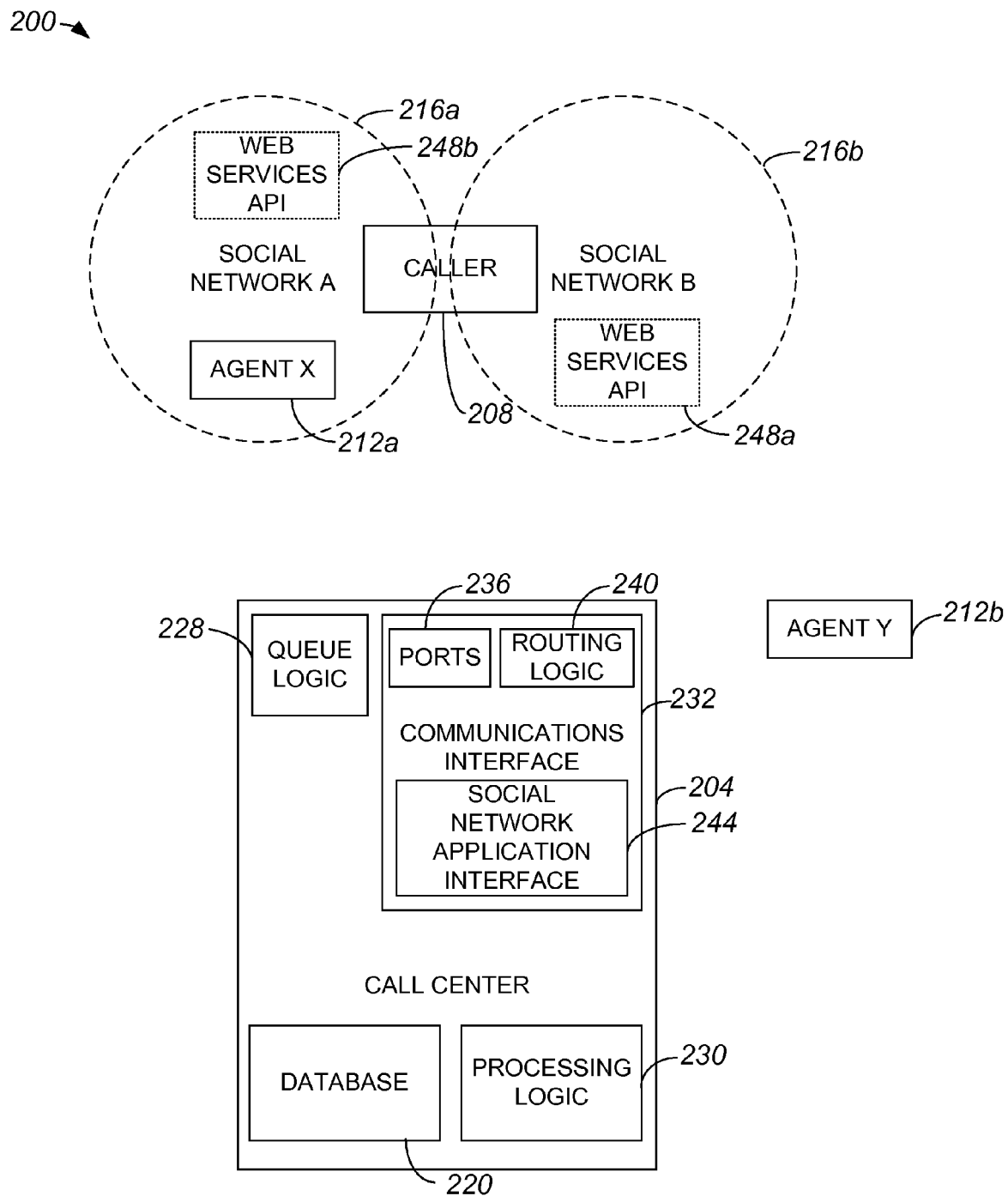
FIG. 2 is a diagrammatic representation of a second overall system which includes a call center that utilizes social network information gathered substantially in real-time to identify call center agents who are socially networked to a caller in accordance with an embodiment of the present invention.

FIG. 2 is a diagrammatic representation of a second overall system which includes a call center that utilizes social network information gathered substantially in real-time to identify call center agents who are socially networked to a caller in accordance with an embodiment of the present invention. An overall system 200 includes a call center 204 with call center agents 212a, 212b.

Call center 204 includes a communications interface 232 which allows agents 212a, 212b to communicate with caller 208. Communications interface 232 includes ports 236 on which a call from caller 208 may be received, as well as routing logic 240 that routes calls to an appropriate agent 212a, 212b. Social network application interface 244 is configured to obtain information regarding social networks 216a, 216b of caller 208 through web services application programmer's interfaces (API) 248a, 248b associated with social networking websites or applications (not shown) which support social networks 216a, 216b. Caller 208 may provide information including, but not limited to including, the name of a social networking website (not shown) and his or her user identifier (userid) for the social network website. Using such information, social network application interface 244 may obtain relevant information about caller 208 from the named social network website (not shown). In one embodiment, social network information obtained in real-time, e.g., when caller 208 calls into call center 204, may be stored in database 220.

Queue logic 228 generally allows dynamic queues to be maintained for agents 212a, 212, and dynamically queues caller 208 into an appropriate queue depending upon which agent 212a, 212b is selected to provide assistance to caller 208. Processing logic 230 identifies an area of expertise that may be useful in providing assistance to caller 208, when caller 208 calls into call center 204. Processing logic 230 may also identify agents 212a, 212b as having that area of expertise. Using information obtained by social network application interface 244, processing logic 230 may identify agent 'X' 212a as being a member of social network 'A' 216a associated with caller 208 and, further, allow caller 208 to elect to receive assistance from agent 'X' 212a. When caller 208 elects to receive assistance from agent 'X' 212a, queue logic 228 places caller 208 in the dynamic queue (not shown) associated with agent 'X' 212a.

Figure 3:
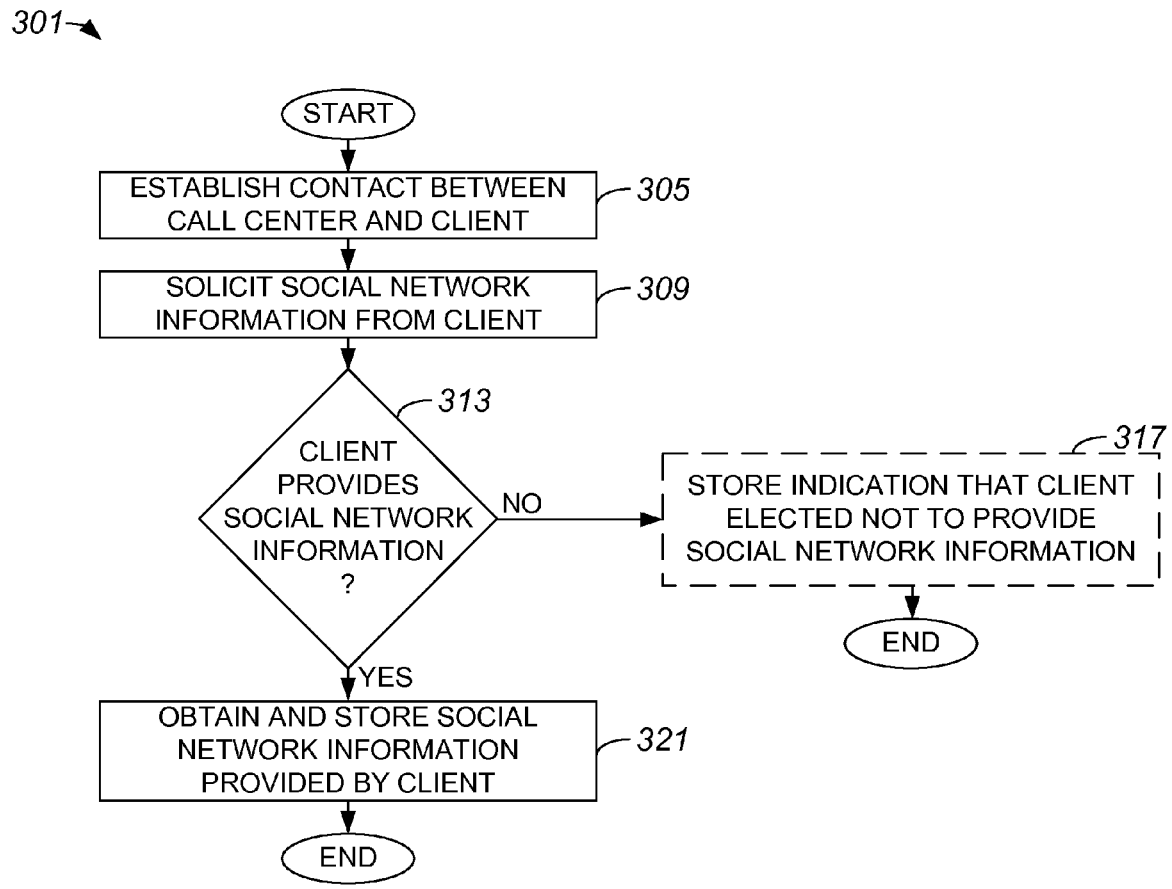
FIG. 3 is a process flow diagram which illustrates a method of initially obtaining social network information for use by a call center in accordance with an embodiment of the present invention.

Social network information may initially be provided to a call center by a client, or a potential caller to the call center, such that the social network information is effectively available when the client calls into the call center in the future. Using that information, the call center may access social networking websites or applications to obtain information regarding the social relationships of the client. With reference to FIG. 3, a process of initially obtaining social network information periodically for use by a call center will be described in accordance with an embodiment of the present invention. A process 301 of obtaining social network information begins at step 305 in which contact is established between the call center and a client. Although contact may be established via a phone call, it should be appreciated that a client may instead be in contact with the call center through e-mail or other communication channels beside phone lines. Either the call center or the client may initiate contact. Further, the established contact may occur before the client becomes a caller who solicits assistance from the call center, or when the client calls into the call center seeking assistance. That is, contact that enables social network information to initially be obtained may occur either before the client seeks assistance from the call center or substantially when the client has called into the call center to seek assistance.

After contact is established between the call center and the client, social networking information is solicited from the client in step 309. Soliciting social network information may include, but is not limited to including, prompting the client to input login information and password information for his or her accounts with social networking websites or applications.

Once social networking information is solicited from the client, it is determined in step 313 whether the client provides his or her social networking information. The client may elect not to provide, or otherwise share, his or her social networking information with the call center. If the client does not provide his or her social networking information, the call center may store an indication in step 317 which indicates that the client elected not to provide social networking information. In one embodiment, the call center may also store information which indicates that the client was provided with the opportunity to provide social network information, and elected not to. In such an embodiment, the call center may await an overture from the client, e.g., an indication that the client wishes to provide social network information, before attempting any future solicitation of social network information. After the indication that the client has elected not to provide social network information is stored, the process of obtaining social network information is completed.

Alternatively, if it is determined in step 313 that the client has provided social network information, then the call center obtains and stores the social network information provided by the client in step 321. The social network information that is obtained and stored may include, but is not limited to including, names of social networking websites or applications, login information, password information, and the like. Such social network information may be stored in a record in memory associated with the call center. Once the social network information is stored, the process of obtaining social network information is completed.

In general, social network information may either substantially be obtained periodically, e.g., at predetermined times, or in real-time. By way of example, social network information may be updated either periodically or in real-time. When social network information is obtained periodically, it may be obtained once a day, once a week, or at substantially any predetermined time identified by a system administrator associated with a call center. When social network information is obtained in real-time, the social network information associated with a caller may be obtained by a call center substantially when the caller calls into the call center.

Figure 4:
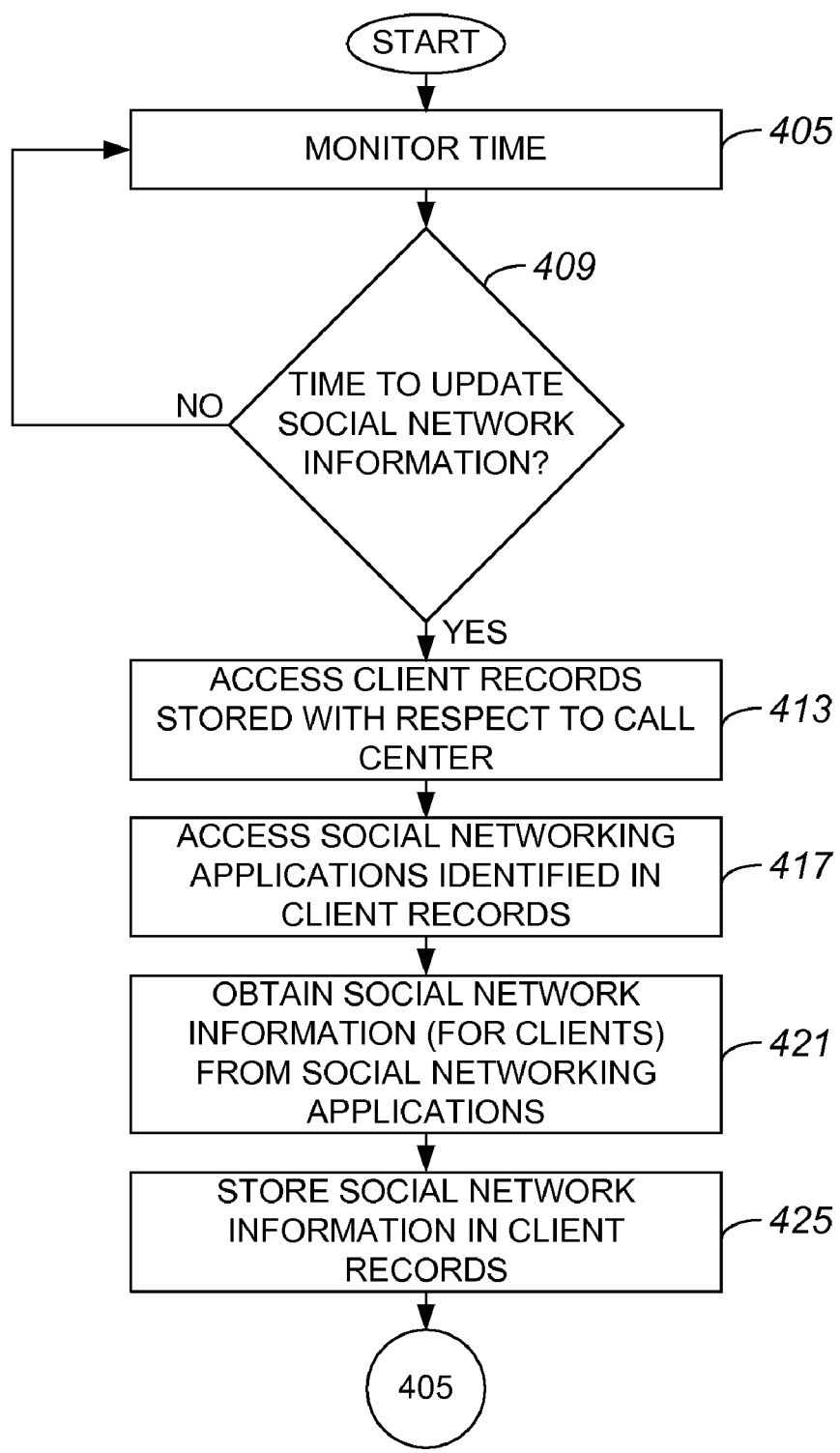
FIG. 4 is a process flow diagram which illustrates a method of periodically updating social network information used by a call center in accordance with an embodiment of the present invention.

FIG. 4 is a process flow diagram which illustrates a method of periodically updating social network information used by a call center in accordance with an embodiment of the present invention. A process 401 of periodically updating social network information begins at step 405 in which a call center monitors time. In step 409, the call center determines whether the time is appropriate to update social network information stored, or other wise maintained, by the call center. Such a determination may include, but is not limited to including, determining whether a predetermined amount of time has elapsed and/or determining if a particular time that is set as an "update time" has been reached.

If it is determined that it is not time to update social network information, the call center continues to monitor time in step 405. On the other hand, if it is determined that it is time to update the social network information, client records which are stored with respect to the call center are updated in step 413. In one embodiment, substantially all client records for all clients of the call center may be accessed. Clients of the call center are effectively those who have either registered with the call center or have previously called into the call center and, hence, are effectively registered with the call center.

Once the client records are accessed, the social networking applications identified in the client records are accessed in step 417. The call center may access the social networking applications which are identified in the client records, e.g., those which support social networks in which clients associated with the client records participate, using information provided in the client records. The access to the social networking applications may be achieved though interfacing with APIs provided by the social networking applications or through any suitable means, e.g., means such as web crawling.

After accessing the social networking applications, social network information is obtained in step 421 from the social networking applications. The social network information that is obtained typically includes information which identifies those in social networks with the clients. The social network information obtained in step 421 is stored in the client records in step 425 such that the client records are essentially updated, and process flow returns to step 405 in which the call center continues to monitor time.

Figure 5:
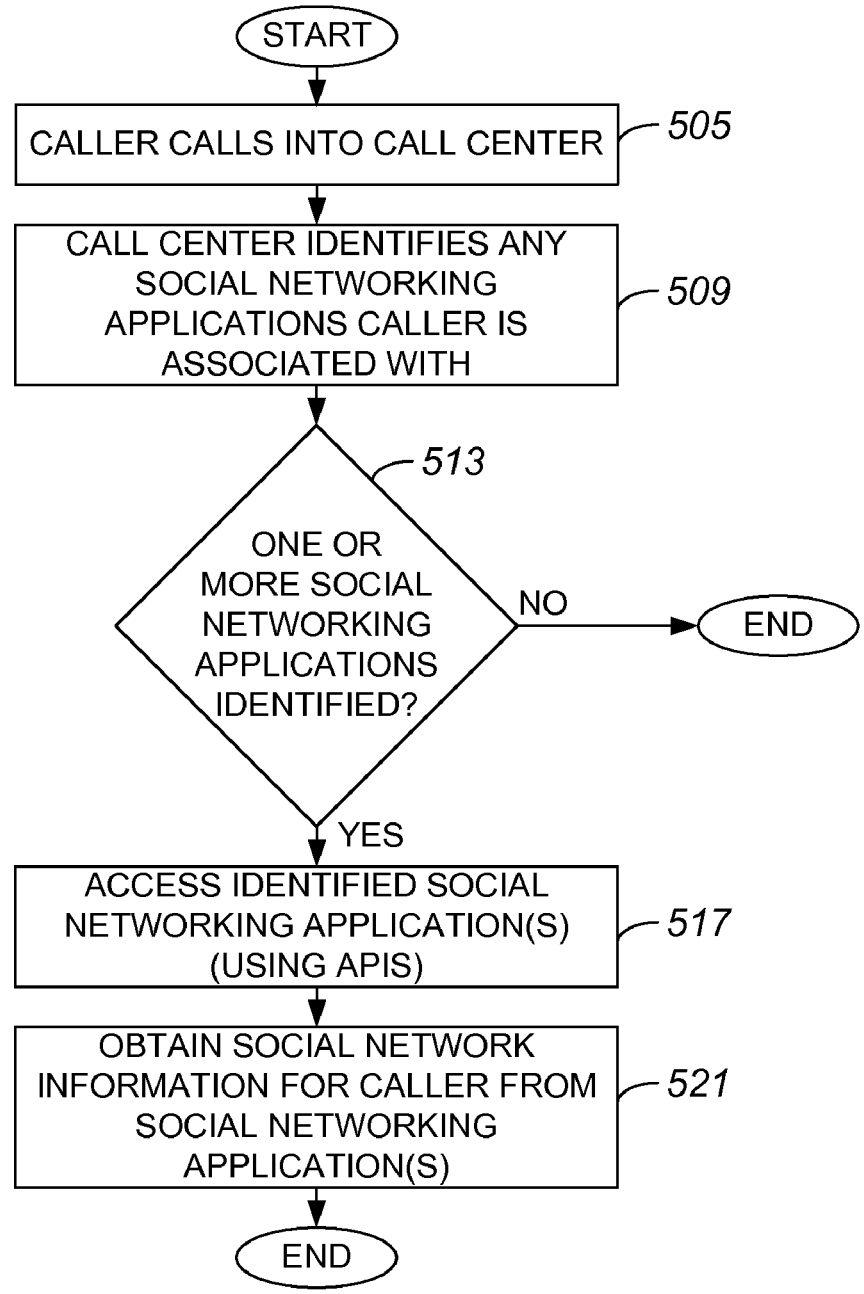
FIG. 5 is a process flow diagram which illustrates a method of updating social network information used by a call center substantially in real-time in accordance with an embodiment of the present invention.

In lieu of updating social network information stored with respect to a call center periodically, the up-to-date social network information may instead be obtained substantially in real-time, e.g., during a call to a call center, as previously mentioned. When social network information is obtained substantially in real-time, it should be appreciated that the social network information may be obtained at substantially the same time that a call from a caller is processed. FIG. 5 is a process flow diagram which illustrates a method of updating social network information used by a call center substantially in real-time in accordance with an embodiment of the present invention. A process 501 of updating social network information in real-time begins at step 505 in which a caller calls into a call center. Typically, the caller is an individual who is utilizing a communications system such as a phone to establish contact with the call center. In step 509, the call center identifies any social networking applications that the caller is associated with. The call center may identify any social networking applications that the caller is associated with using any suitable method. Such methods may include, but are not limited to including, prompting the caller to provide information, and/or accessing a database which stores information that identifies the social networking applications that the caller is associated with.

After any social networking applications the caller effectively uses are identified, a determination is made in step 513 as to whether any social networking applications have actually been identified. If it is determined that no social networking applications have been identified as being used by the caller, then there is effectively no need to update social network information. As such, the process of updating social network information is completed.

Alternatively, if it is determined in step 513 that one or more social networking applications have been identified, then the call center accesses the one or more identified social networking applications in step 517. A social networking application may be accessed using an API provided by the social networking application, or by other means such as web crawling. If a social networking application is accessed using login information and password information associated with an account owned by the caller, it should be appreciated that the caller may either provide such information each time it is needed, or the call center may maintain such information such that it is readily accessible.

Once the one or more social networking applications are accessed, social network information associated with the caller, e.g., information that effectively defines a social network of the caller, is obtained from the one or more social networking applications in step 521. Such information may be stored in memory associated with the call center, although such information may instead be used substantially without being stored in memory. The process of updating social network information is completed upon obtaining the social network information.

Figure 6A:
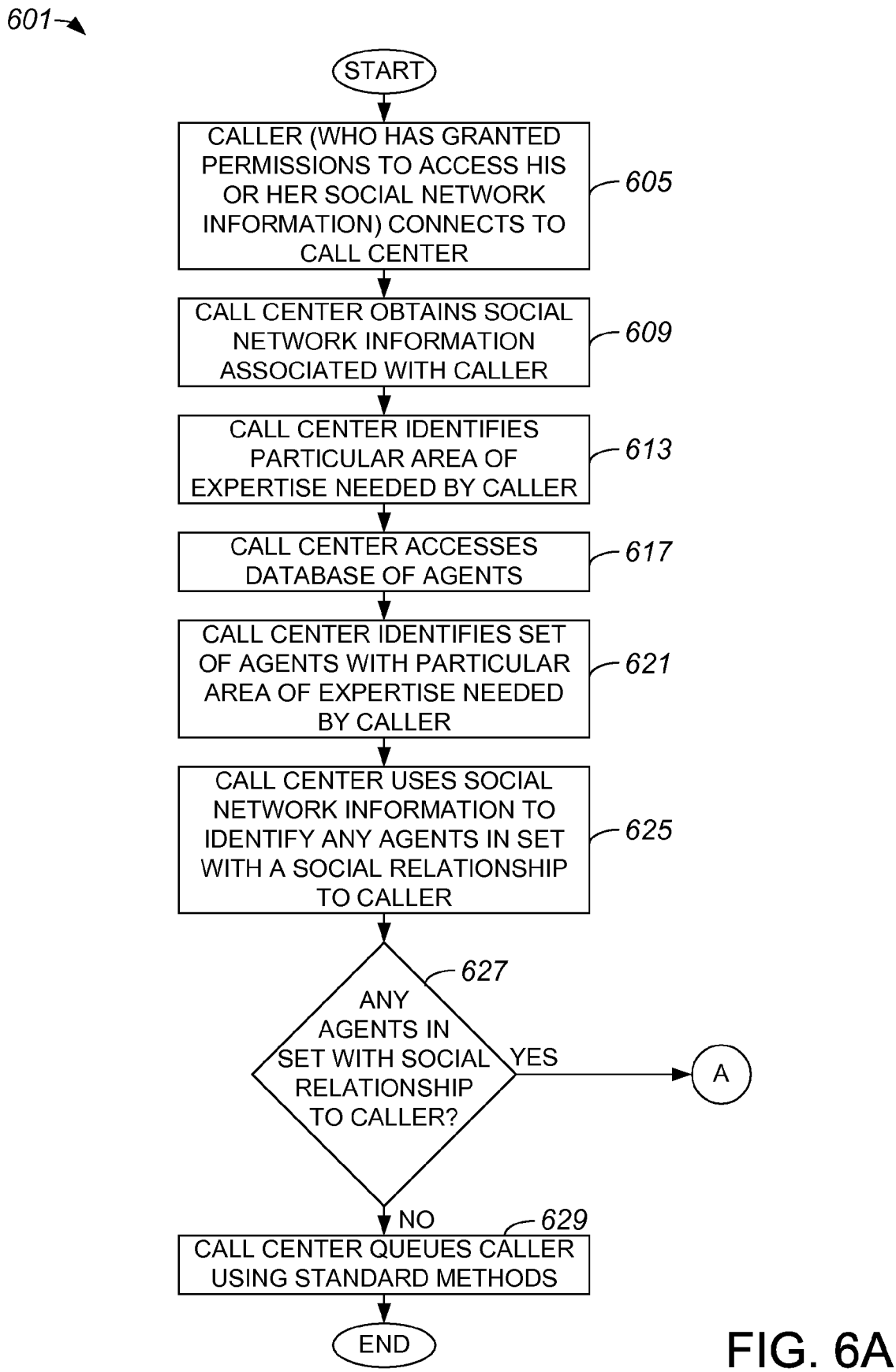
FIGS. 6A and 6B are a process flow diagram which illustrates a method of using social network information to identify at least one agent who may handle a call from a customer in accordance with an embodiment of the present invention.
Figure 6B:
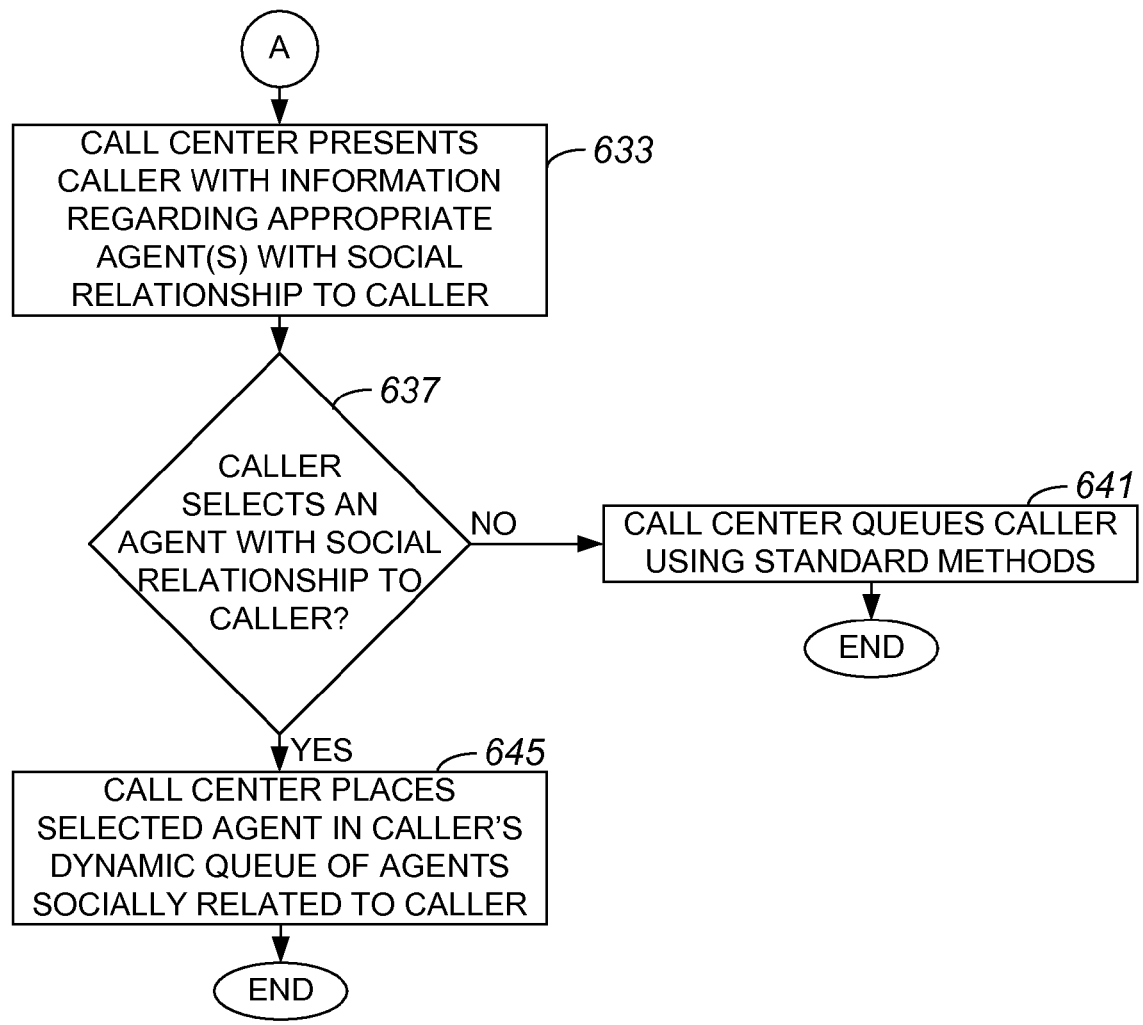

FIGS. 6A and 6B are a process flow diagram which illustrates a method of using social network information to identify at least one agent who may handle a call from a customer in accordance with an embodiment of the present invention. A process 601 of using social network information to identify a call center agent who effectively has some social relationship with a caller begins at step 605 in which a caller connects to a call center. For purposes of illustration, it is assumed that the caller has granted the appropriate permissions which enable the call center to gain access to the social network information of the caller.

Once the caller connects to the call center, e.g., once the caller calls into the call center, the call center obtains social network information associated with the caller in step 609. The social network information may be obtained from a database associated with the call center and/or from social networking applications substantially in real-time. The call center identifies a particular area of expertise needed by the caller in step 613. Such a determination may be made by the call center using information provided by the caller.

In step 617, the call center accesses a database of agents. Typically, the database of agents may include listings of the areas of expertise supported by particular call center agents. In one embodiment, the database of agents may include social network information about the agents, e.g., social network information that is voluntarily provided to the call center. Such information about the agents may be updated using any suitable method such as, but not limited to, a method similar to that described above with respect to FIG. 4

After the call center accesses the database of agents, the call center identifies a set of agents who have the particular expertise needed by the caller in step 621. Then, the call center uses the social network information in step 625 to identify any agents in the set who have a social relationship to the caller. It should be appreciated that a social relationship may encompass any number of degrees of separation, depending upon specifications provided with respect to the call center. By way of example, a social relationship may be defined as substantially only a direct relationship in which the caller directly knows a call center agent. However, a social relationship may instead be defined as an indirect relationship in which there are one or more degrees of separation between a caller and an agent. In general, any number of degrees of separation or, any social distance, may be used to define a social relationship. A social distance of an agent relative to a caller may be determined by accounting for the social distance or the degree of separation between the agent and the caller with respect to a social network, and/or the priority assigned to the social network website associated with the social network, A determination is made in step 627 as to whether any agents in the set have a social relationship to the caller. If the determination is that there are no agents in the set who have a social relationship to the caller, then the call center queues the caller using standard methods in step 629. Queuing the caller may include adding the caller to a general queue of callers seeking assistance from the first available agent in the particular area of expertise. Once the call center queues the caller using standard methods, the process of using social network information to identify a call center agent with a social relationship to the caller is completed.

Alternatively, if it is determined in step 627 that there is at least one agent in the set who has a social relationship to the caller, then the call center presents the caller with information regarding the agents with both the expertise desired by the caller, as well as a social relationship to the caller in step 633. Presenting the caller with information may include informing the caller of how he or she is socially related to the agent. By way of example, the call center may inform the caller that a particular agent is a friend of a friend.

The caller may be presented with an option to select an agent from whom he or she would like to obtain assistance. Hence, the caller may elect either to receive assistance from a substantially random agent with the requisite expertise, or to receive assistance from an agent who has both the expertise desired by the caller and some sort of a social relationship to the caller, i.e., with whom he or she is essentially socially networked. As such, a determination is made in step 637 as to whether the caller has selected an agent with whom he or she has a social relationship.

If it is determined that the caller has selected an agent with whom he or she has a social relationship, the call center places the selected agent in a dynamic queue the caller in step 645, and the process of using social network information to identify a call center agent with a social relationship to the caller is completed. The caller's dynamic queue is generally created for the caller, and effectively contains a list of agents who have the desired expertise, e.g., the expertise sought by the caller, and have a social relationship with the caller. In one embodiment, the caller's dynamic queue may be arranged to identify the selected agent as the preferred agent, while identifying other potentially suitable agents. Such a dynamic queue may be sorted using various algorithms including, but not limited to including, levels of expertise of the agents and/or the social distances between the caller and the agents.

On the other hand, if the caller has effectively not elected to receive assistance from an agent with whom he or she has a social relationship in step 637, then the call center queues the caller using standard methods, e.g., adds the caller to a general queue associated with the area of expertise sought by the caller, in step 641. The process of using social network information to identify a call center agent with a social relationship to the caller is completed after the caller is queued.

Figure 7:
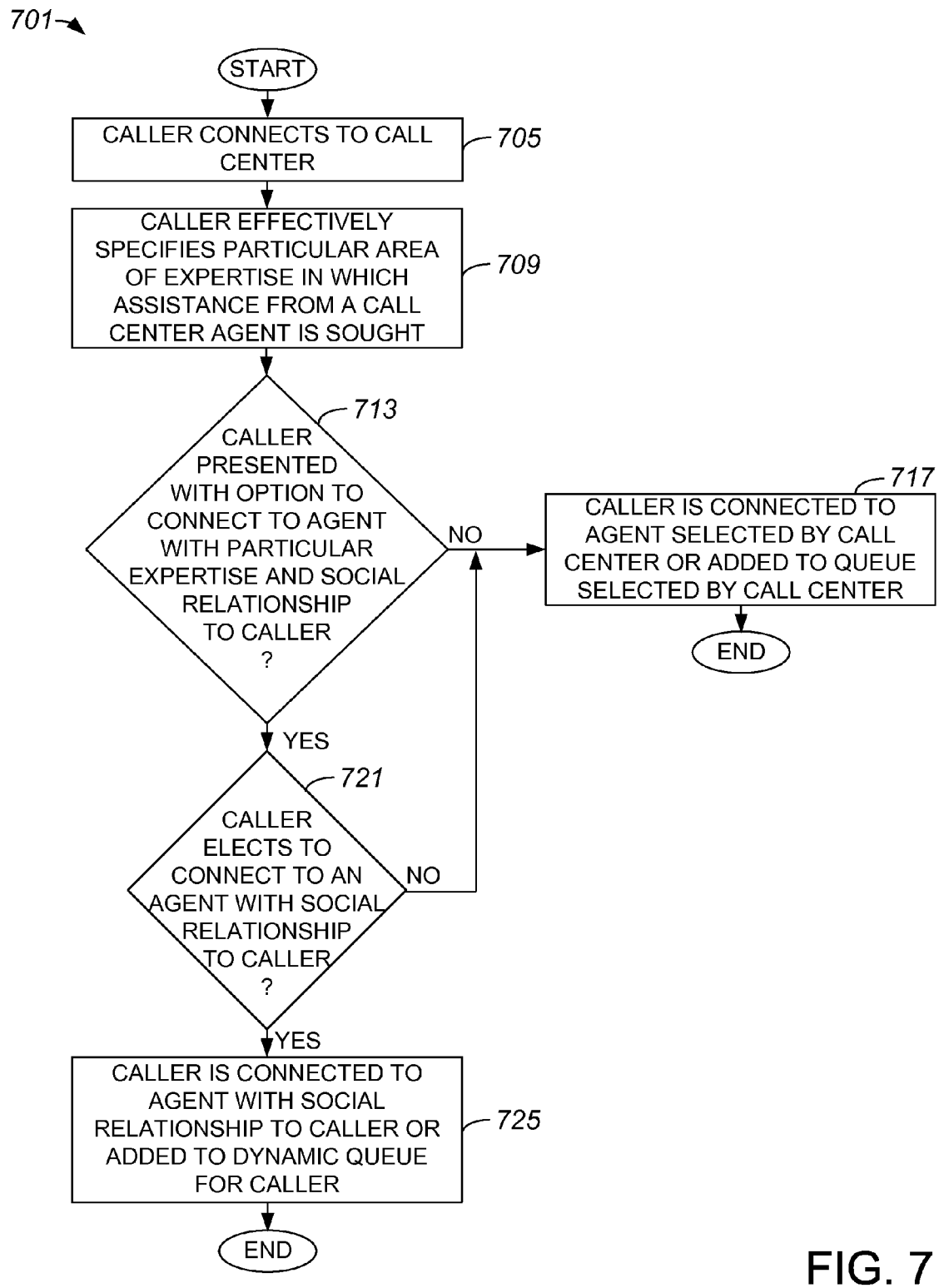
FIG. 7 is a process flow diagram which illustrates a method of obtaining assistance from a call center which utilizes social network information in accordance with an embodiment of the present invention.

Referring next to FIG. 7, a process of obtaining assistance from a call center which utilizes social network information will be described in accordance with an embodiment of the present invention. A process 701 of obtaining assistance from a call center begins at step 705 in which a caller connects to the call center. The customer may generally connect to the call center by calling into the call center using a telephone system or a computing system.

In the described embodiment, it is assumed that the caller has connected to the call center in the past, and that the call center may readily obtain social network information associated with the caller. That is, it is assumed that the call center already either has social network information associated with the caller or has information needed to obtain the social network information substantially in real-time. The information needed to obtain the social network information substantially in real-time may include, but is not limited to including, addresses of social networking websites or applications used by the caller, and information needed to log into or otherwise gain access to such websites or applications.

After the caller connects to the call center, the caller effectively specifies the particular area of expertise in which assistance from a call center agent is sought in step 709. The caller may provide information to the call center, as for example through interacting with menus or through speaking with someone associated with the call center, which the call center may use to determine the particular area of expertise that is relevant to the caller.

From step 713, process flow moves to step 713 in which it is determined if the caller is presented with an option to connect to a call center agent who has the particular expertise sought by the caller, as well as a social relationship to the caller. In other words, it is determined whether there is a call center agent who is in an extended social network of the caller and has the particular expertise sought by the caller. An agent with a social relationship to the caller may have either a direct or indirect social relationship with the caller. That is, the social distance between the agent and the caller may vary depending upon the requirements of a particular call center system. The caller and the agent may have an indirect social relationship when they may have a social relationship separated by more than one degree of separation. Typically, the social distance between a caller and an agent may be calculated by accounting for at least the number of degrees of separation between the caller and the agent at a given social networking website.

If it is determined that the caller has not been presented with an option to connect to a call center agent who has the particular expertise sought by the caller, as well as a social relationship to the caller, the caller is either connected to a call center agent selected by the call center, or added to a dynamic queue selected by the call center in step 717. The call center may connect the caller to an agent with the particular expertise desired by the caller, if such an agent is currently available. If such an agent is not available, the call center may effectively add the caller to a queue for an agent, or agents, with the particular area of expertise. Once the caller is either connected to an agent or added to a dynamic queue associated with the desired area of expertise, the process of obtaining assistance from a call center is completed.

Alternatively, if it is determined in step 713 that the caller is presented with an option to connect to an agent with a social relationship to the caller, and the particular expertise desired by the caller, then the caller may elect to connect to that agent. That is, the caller has an option to either connect to an agent with whom the caller has a social relationship, or connect to another agent. If it is determined that the caller has not elected to connect to an agent with whom the caller has a social relationship, then process flow moves to step 717 in which the caller is connected to an agent selected by the call center or, if no appropriate agent is available, is added to a dynamic queue selected by the call center.

On the other hand, if the caller elects in step 721 to connect to an agent with whom the caller has a social relationship, the caller is connected to that agent in step 725 if that agent is available. If the agent with whom the caller has a social relationship is not available, then the agent may be added to the dynamic queue for that caller. As previously mentioned, the dynamic queue is created for the caller and is arranged to essentially include agents who have the expertise desired by the caller, and a social relationship to the caller. Once the caller is either connected with an agent or the agent is added to the dynamic queue for the caller, the process of obtaining assistance from a call center is completed.

In addition to using social networking relationships or social distances to identify particularly suitable call center agents for providing assistance to callers, social networking relationships may be used, e.g., by systems having call centers, to substantially target parties for calls. That is, social network information of customers of an organization may be used to identify potential customers to whom targeted calls may be made. By way of example, an organization such as a bank may use social network information of mortgage customers to identify others who may be interested in mortgages and, hence, target those others for receiving calls that provide information about mortgages.

Figure 8:
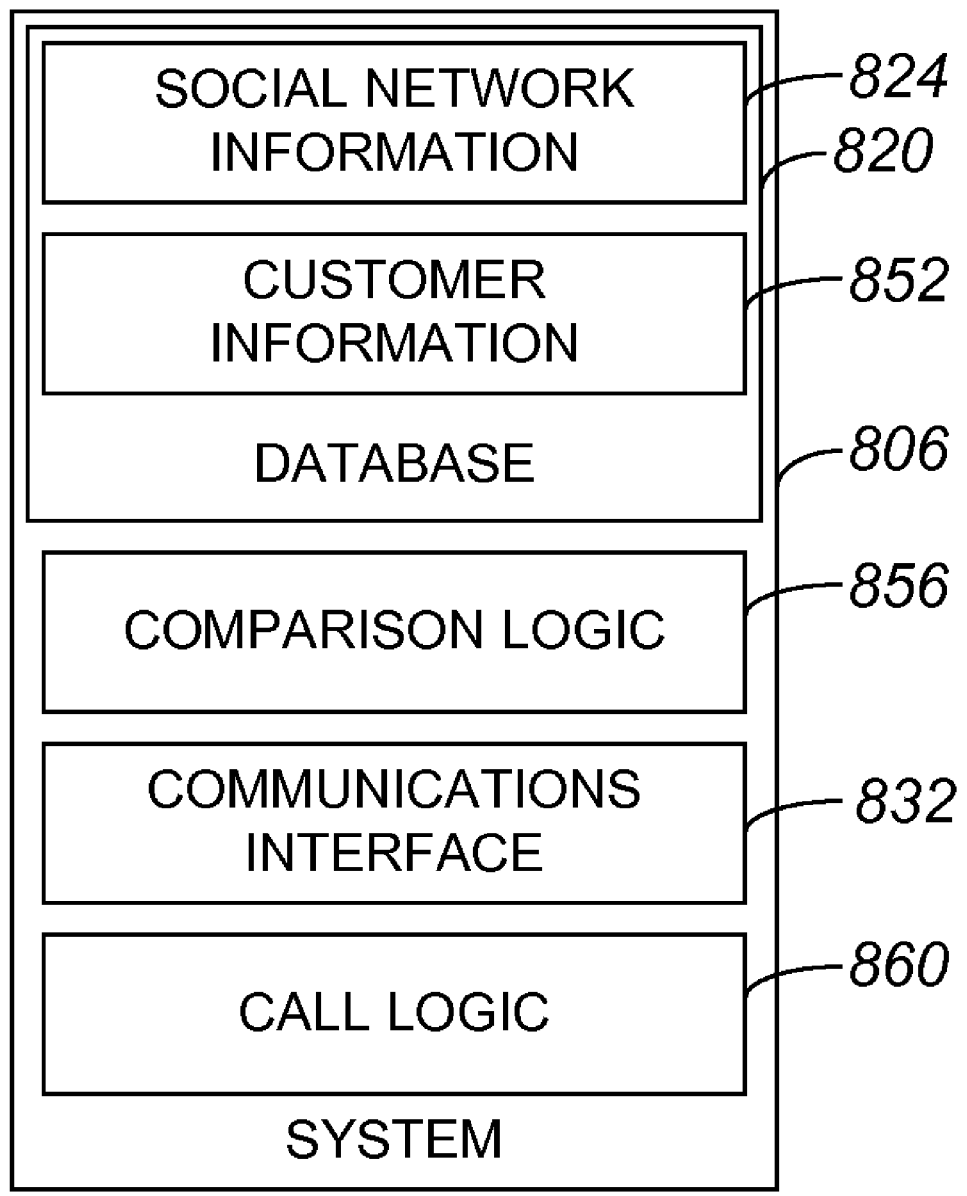
FIG. 8 is a diagrammatic representation of an organization which uses social network information to target parties in accordance with an embodiment of the present invention.

FIG. 8 is a diagrammatic representation of an organization, e.g., an organization with an associated call center, which uses social network information to target parties or potential customers for calls in accordance with an embodiment of the present invention. A system 806 may generally be an organization or entity which is associated with a call center. System 806 includes a database 820 in which social network information 824 and customer information 852 is stored. Social network information 824 includes information that identifies parties which have a social relationship to customers associated with system 806 and, hence, identified in customer information 852. In general, a customer provides permission to system 806 to obtain and store social network information 824 pertaining to the customer. Customer information 852 includes information that identifies customers, as well as information regarding purchases made by the customers. By way of example, if system 806 is associated with a financial institution, customer information 852 may include information regarding types of investments made by customers, types of loans taken out by customers, and/or types of financial services used by customers. In one embodiment, customer information 852 may include information which indicates whether customers have granted permission for their information to be shared with members of their social networks.

A communications interface 832 effectively connects system 806 to social networking applications from which social network information 824 may be obtained, e.g., substantially periodically. Comparison logic 856 is operable to identify parties to whom to target calls based on social network information 824 and customer information 852. Comparison logic 856 may compare or otherwise process social network information 824 associated with customers identified in customer information 852 to identify appropriate parties to target. For example, if system 806 is associated with a bank, comparison logic 856 may use customer information 852 to identify a customer who has taken out a mortgage with the bank, and then process social network information 824 associated with the customer to identify those in the customer's social network who may be interested in being targeted with mortgage information.

Call logic 860 is arranged to call parties who are identified as being suitable for receiving targeted calls. Call logic 860 may identify phone numbers for parties to be called, cause those phone numbers to be dialed, and then provide targeted information to the parties. The targeted information provided to a receiving party, in one embodiment, may include information about the product, e.g., service or physical product, that system 806 is offering, and the name of the customer in whose social network the party is included.

Figure 9:
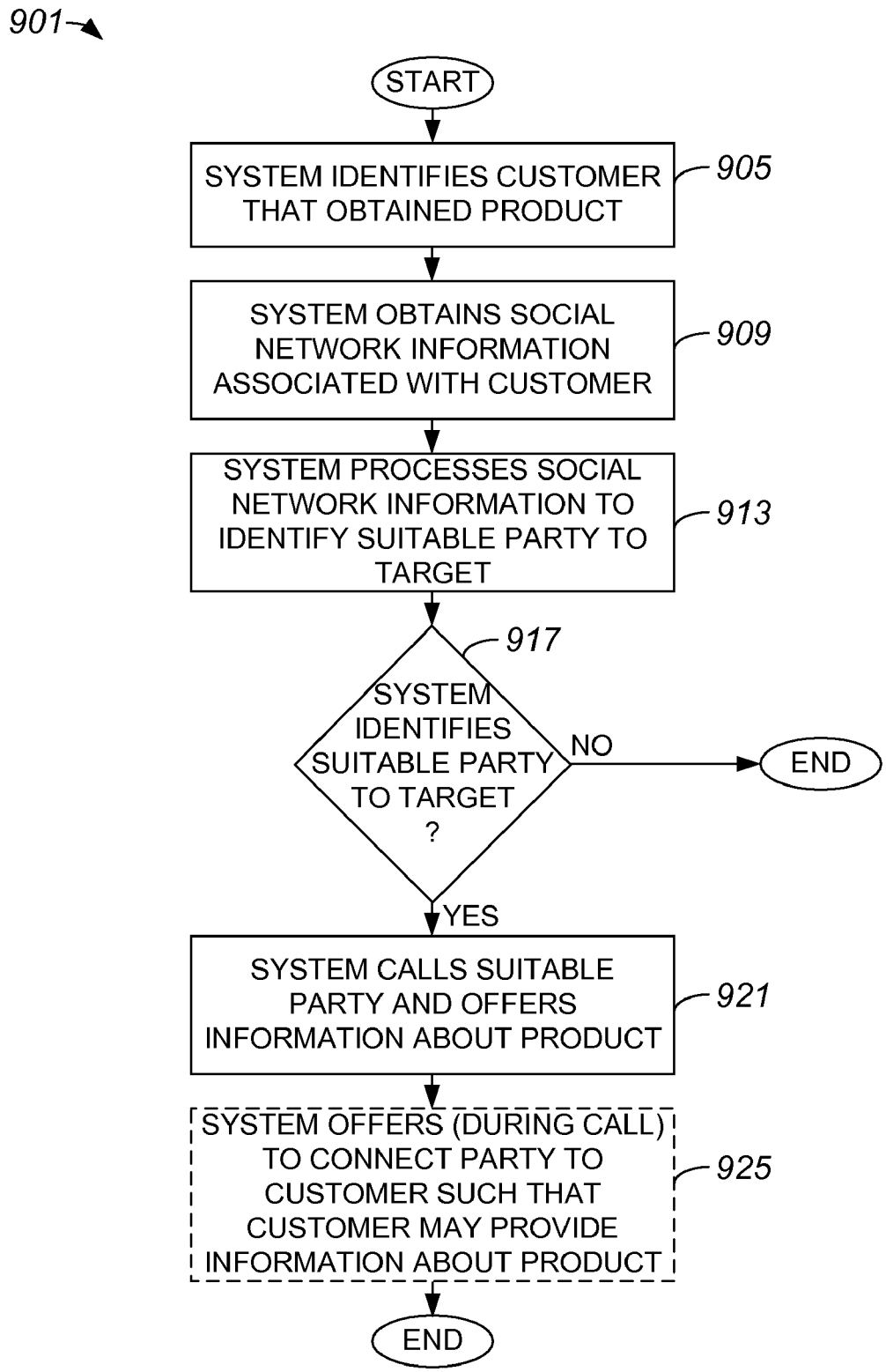
FIG. 9 is a process flow diagram which illustrates a method of providing a party with targeted information based on social network information in accordance with an embodiment of the present invention.

FIG. 9 is a process flow diagram which illustrates a method of providing a party with targeted information through a "cold call," or substantially unsolicited call, based on social network information in accordance with an embodiment of the present invention. A process 901 of providing a party with targeted information begins at step 905 in which a system, e.g., system 806 of FIG. 8, identifies a customer that obtained a product. The product may generally be a service or an item. In general, obtaining a product may include purchasing a product.

Once the system identifies a customer, the system obtains social network information associated with the customer in step 909. The social network information, which may be obtained from a database associated with the system, may identify social relationships between the customer and parties, or potential customers. The system processes the social network information in step 913 in order to identify a suitable party to target. The suitable party, or an appropriate party to target, may generally be a party that is identified by the system as being likely to be interested in the product based on the social network information 913. For example, if the product obtained by the customer is a student loan and the social network information indicates that the customer is a member of a social network of students, then other members of the social network may be assumed to be students and, thus, identified as being suitable to receive targeted information about student loans.

A determination is made in step 917 as to whether a suitable party to target has been identified. If no suitable party to target has been identified, then the process of providing a party with targeted information is completed. Alternatively, if it is determined that the system has identified a suitable party to target, then the system calls the suitable party in step 921, and offers information about the product. Optionally, in step 925, the system may offer to connect the party to the customer, i.e., the customer in the party's social network who has obtained the product, such that the customer may provide information about the product to the party. In one embodiment, if the system offers to connect the party to the customer, then the customer effectively must give permission to the system to disclose that he or she has obtained the product and, further, that the customer is willing to be contacted about the product. After the system calls the suitable party and/or, optionally, after the system offers to connect the party to the customer, the process of providing a party with targeted information is completed.

Although only a few embodiments of the present invention have been described, it should be understood that the present invention may be embodied in many other specific forms without departing from the spirit or the scope of the present invention. By way of example, factors other than social relationships may be used to identify a call center agent who is particularly suitable to provide assistance to a caller. Such factors may include rankings of the call center agent provided by those with whom the caller has a social relationship. For instance, if a caller has a social relationship with a first party who has a social relationship with a call center agent, and the first party ranks the helpfulness of the call center agent at a relatively low level, the caller may be warned that although the first party has a social relationship with the call center agent, the first party did not find the call center agent to be particularly helpful.

Information relating to the amount of time a caller is estimated to have to wait in a queue before he or she is connected to an agent with appropriate expertise may be provided to the caller such that he or she may effectively make an informed decision when he or she selects an agent from whom to receive assistance. For example, if an agent with whom a caller has a social relationship has a relatively long associated wait time, the caller may elect not to select that agent and may, instead, elect to be added to a general queue which is services on a first-come-first-served basis. In other words, in addition to informing a caller of an agent with whom he has some social relationship, the caller may also be provided with information regarding the amount of time the caller may have to wait before that agent is likely to assist him or her. It should be understood that information regarding the amount of time the caller may have to wait in a general queue may also be provided to the caller.

Limits may be associated with the determination of whether a caller and an agent have a social relationship. That is, a substantially maximum number of degrees of freedom which may be permitted in order for a social relationship to be considered to be present. Such a substantially maximum number of degrees of freedom may be arranged to be set as desired by an administrator of a call center.

In lieu of considering both the expertise of an agent and the social distance between the agent and a caller when presenting the caller with information regarding available agents, it is possible to consider substantially only the social distance when presenting the caller with information regarding available agents without departing from the spirit or the scope of the present invention.

To further aid a caller in selecting an agent from whom the caller is to receive assistance, a call center may about information from the caller which may facilitate the effective rankings of agents. The caller may provide information relating to a desired social distance between the agent and the caller, an amount of time the caller is willing to await assistance from any agent, and/or the skill level desired from an agent. Such information may be used by a call center to rank each agent relative to other agents. In one embodiment, either a caller or a call center may select the highest ranking agent as the agent he or she would prefer to receive assistance from.

While targeted information has been described as being provided through a cold call, targeted information may instead be offered to a caller when the caller calls a call center. That is, targeted information may be provided to a caller when the caller initiates contact with a call center. For instance, when a caller calls into a call center, the call center may identify parties in the caller's social network who have obtained a particular product, and then offer the caller information about the particular product.

In one embodiment, a social networking application may initially provide a call center with information associated with the social network of a user or expected caller. That is, a social networking application may effectively set up a call center to use social networking information to match a user with specific call center agents. By way of example, when a user accesses a social networking application to which he or she is subscribed, the social networking application may provide the user with an option to provide information relating to his or her social network substantially directly to a call center.

Various social networking applications from which social network information is obtained by a call center may be assigned a priority such that agents who are associated with a high priority social networking application may be considered to be more desirable than agents linked to a caller through a lower priority social networking application. Similarly, socially relevant information may be assigned priorities. For example, an agent who attended the same school at the same time as a caller may be assigned a higher social priority than an agent who attended the same school at a different time from the caller.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
connecting on a call with a caller;
determining if social network information associated with the caller is available, the social network information being information associated with a membership of the caller in a social network;
obtaining the social network information associated with the caller if it is determined that the social network information is available;
utilizing the social network information to identify at least a first agent suitable for participating on the call with the caller, the at least first agent being associated with a call center, wherein the call center is not associated with the social network, wherein utilizing the social network information to identify the at least first agent suitable for participating on the call with the caller includes utilizing the social network information to determine that the at least first agent is a member of the social network; and
providing the caller with information that identifies the at least first agent as being suitable for participating on the call with the caller.

2. The method of claim 1 wherein providing the caller with the information that identifies the at least first agent as being suitable for participating on the call with the caller includes informing the caller of a social networking relationship between the caller and the at least first agent.

3. The method of claim 2 further including:
identifying at least a second agent suitable for participating on the call with the caller, wherein the at least second agent is identified without utilizing the social network information, the at least second agent being associated with the call center;
providing the caller with information that identifies the at least second agent suitable for participating on the call with the caller; and
providing the caller with an option to select between the first agent and the second agent for participating on the call with the caller.

4. The method of claim 2 wherein informing the caller of the social network relationship between the caller and the at least first agent includes informing the caller that the at least first agent is socially networked to the caller in the social network.

5. The method of claim 1 wherein obtaining the social network information associated with the caller includes accessing a data storage arrangement, wherein the social network information is stored in the data storage arrangement.

6. The method of claim 1 wherein obtaining the social network information associated with the call includes accessing a social networking application, the social networking application being external with respect to the call center.

7. The method of claim 1 further including:
obtaining an indication that the caller selects the first agent to participate on the call with the caller; and
connecting the call with the caller to the first agent.

8. The method of claim 7 further including:
determining if the first agent is available to participate on the call; and
queuing the first agent in a queue associated with the caller if it is determined that the first agent is not available to participate on the call.

9. The method of claim 1 wherein determining if the social network information is available includes determining if the caller has provided permission to the call center to obtain the social network information from the social network.

10. The method of claim 1 further including:
obtaining a set of social network information associated with the first agent.

11. The method of claim 10 further including:
updating the set of social network information associated with the first agent.

12. Logic encoded in one or more non-transitory tangible computer-readable media for execution and when executed operable to:
connect on a call with a caller;
determine if social network information associated with the caller is available, the social network information being information associated with a membership of the caller in a social network;
obtain the social network information associated with the caller if it is determined that the social network information is available;
utilize the social network information to identify at least a first agent suitable for participating on the call with the caller, the at least first agent being associated with a call center, wherein the call center is not associated with the social network, and wherein the logic operable to utilize the social network information to identify the at least first agent suitable for participating on the call with the caller is further operable to utilize the social network information to determine that the at least first agent is a member of the social network; and
provide the caller with information that identifies the at least first agent as being suitable for participating on the call with the caller.

13. The logic of claim 12 wherein the logic operable to provide the caller with the information that identifies the at least first agent as being suitable for participating on the call with the caller is further operable to inform the caller of a social networking relationship between the caller and the at least first agent.

14. The logic of claim 13 further operable to:
identify at least a second agent suitable for participating on the call with the caller, wherein the at least second agent is identified without utilizing the social network information, the at least second agent being associated with the call center;
provide the caller with information that identifies the at least second agent suitable for participating on the call with the caller; and
provide the caller with an option to select between the first agent and the second agent for participating on the call with the caller.

15. The logic of claim 14 wherein the logic operable to obtain the social network information associated with the caller is further operable to access a data storage arrangement, wherein the social network information is stored in the data storage arrangement.

16. The logic of claim 12 wherein the logic operable to obtain the social network information associated with the call is further operable to access a social networking application, the social networking application being external with respect to the call center.

17. The logic of claim 12 further operable to:
obtain an indication that the caller selects the first agent to participate on the call with the caller; and
connect the call with the caller to the first agent.

18. The logic of claim 17 further operable to:
determine if the first agent is available to participate on the call; and queue the first agent in a queue associated with the caller if it is determined that the first agent is not available to participate on the call.

19. The logic of claim 12 wherein the logic operable to determine if the social network information is available is further operable to determine if the caller has provided permission to the call center to obtain the social network information from the social network.

20. An apparatus comprising:
    means for connecting on a call with a caller;
    means for determining if social network information associated with the caller is available, the social network information being information associated with a membership of the caller in a social network;
    means for obtaining the social network information associated with the caller if it is determined that the social network information is available;
    means for utilizing the social network information to identify at least a first agent suitable for participating on the call with the caller, the at least first agent being associated with a call center; and
    means for providing the caller with information that identifies the at least first agent as being suitable for participating on the call with the caller.

21. An apparatus comprising:
    an interface, the interface being arranged to connect on a call to a first caller;
    a first arrangement, the first arrangement being arranged to obtain social network information associated with the first caller, the social network information being information associated with a membership of the caller in a social network; and
    logic arranged to identify at least a first agent suitable for processing the call using the social network information, wherein the first agent has a social relationship to the first caller in the social network, the logic further being arranged to provide an indication to the first caller that indicates that the first agent has the social relationship to the caller in the social network.

22. The apparatus of claim 21 wherein the logic is further arranged to determine if the first caller has selected the first agent to process the call, and to add the first agent to a queue associated with the first caller if the first caller has selected the first agent to process the call.

23. The apparatus of claim 22 wherein the logic is further arranged to identify at least a second agent suitable for processing the call, the second agent having no social relationship with the first caller.

24. The apparatus of claim 23 wherein the logic is further arranged to add the first caller to a queue associated with the second agent if the first caller has not selected the first agent to process the call.

25. The apparatus of claim 21 further including:
    a database, the database being arranged to store the social network information, wherein the first arrangement is arranged to obtain the social network information from the database.

26. The apparatus of claim 25 wherein the first arrangement is arranged to obtain the social network information from a social networking application associated with the social network.

27. The apparatus of claim 21 wherein the first agent is part of a call center, and wherein the call center is not associated with the social network.

* * * * *